US00RE38019E

(19) United States
(12) Reissued Patent
Gueret

(10) Patent Number: US RE38,019 E
(45) Date of Reissued Patent: Mar. 11, 2003

(54) BRUSH HAVING A PLANO-CONCAVE PROFILE

(75) Inventor: Jean-Louis H. Gueret, Paris (FR)

(73) Assignee: L'Oreal, Paris (FR)

(21) Appl. No.: 09/761,701

(22) Filed: Jan. 18, 2001

Related U.S. Patent Documents

Reissue of:
(64) Patent No.: 5,860,432
Issued: Jan. 19, 1999
Appl. No.: 08/868,148
Filed: Jun. 3, 1997

(30) Foreign Application Priority Data

Jun. 7, 1996 (FR) ..... 96 07109

(51) Int. Cl.[7] ..... A45D 40/26
(52) U.S. Cl. ..... 132/218; 132/317; 132/320; 401/122; 15/206
(58) Field of Search ..... 132/218, 313, 132/317, 320; 401/122, 129, 153; 15/160, 206, 207.2, 164

(56) References Cited

U.S. PATENT DOCUMENTS

| | | | | |
|---|---|---|---|---|
| 1,962,854 A | * | 6/1934 | Anderson | |
| 2,448,603 A | * | 9/1948 | Kevin et al. | 401/122 |
| 4,921,366 A | * | 5/1990 | Hurrell | 401/126 |
| 4,927,281 A | * | 5/1990 | Gueret | 132/218 |
| 5,137,038 A | * | 8/1992 | Kingsford | 132/218 |
| 5,595,198 A | | 1/1997 | Kemmerer | |
| 5,613,258 A | * | 3/1997 | Hilfinger et al. | 15/206 |
| 5,876,138 A | | 3/1999 | Gueret | |

FOREIGN PATENT DOCUMENTS

| | | | |
|---|---|---|---|
| EP | 0 511 842 | 6/1998 | |
| FR | 726 157 | 5/1932 | |
| FR | 2 701 198 | * 8/1994 | |
| FR | 2 715 038 | * 7/1995 | |
| GB | 1335322 | * 10/1973 | 401/122 |
| GB | 2 146 520 | * 4/1985 | |
| JP | 56-91507[U] | 12/1954 | |
| JP | 56-91507 | 7/1981 | |
| JP | 58-88912 | 5/1983 | |
| JP | 58-88912[U] | 6/1983 | |
| JP | 5-88410 | 4/1993 | |
| JP | 5-88410[U] | 12/1993 | |
| WO | WO 93/16617 | * 9/1993 | |

OTHER PUBLICATIONS

Co–pending Reissue Application No. 09/745,255; Title: Progressive Brush for Applying a Cosmetic Product Inventor(s): Jean–Louis H. Gueret U.S. Filing Date: Dec. 22, 2000.

Co–pending Reissue Application No. 09/773,946; Title: Brush Having a Plano–Convex Profile Inventor(s): Jean–Louis H. Gueret U.S. Filing Date: Feb. 2, 2001.

English language Derwent Abstract of JP 56–91507, Jul. 24, 1981.

English language Derwent Abstract of JP 58–88912, May 27, 1983.

English language Derwent Abstract of JP 5–88410, Apr. 9, 1993.

* cited by examiner

*Primary Examiner*—Pedro Philogene
(74) *Attorney, Agent, or Firm*—Finnegan, Henderson, Farabow, Garrett & Dunner, L.L.P.

(57) ABSTRACT

A brush (200) has a straight stem (201) defining a main axis (X—X), a flexible core (202) having a first end integral with the stem and bristles (204) implanted radially in the core. The ends of the bristles define the surface (205) of the brush, this surface having a first face. The intersection of any meridian plane passing through the main axis with the surface of the brush defines two peak lines (207) having a specific curvature. The core is curved, the peak lines (207) are concave and the first face (207.1) is substantially straight and parallel to the main axis (X—X).

174 Claims, 3 Drawing Sheets

BRUSH HAVING A PLANO-CONCAVE PROFILE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a brush, in particular a brush for applying a cosmetic product to the keratinous fibers, especially for applying mascara to the eyelashes or a dye to the hair, and to a make-up device comprising this brush, the brush having a substantially plano-concave profile.

2. Description of the Related Art

Conventionally, a brush for applying a cosmetic product generally comprises an elongate core formed by the helical winding of two branches of a metal wire and bristles implanted radially in this core and gripped between these wound branches. Such brushes may be of various shapes and may comprise cut-outs.

If these brushes are used for applying mascara to the eyelashes, such shapes and such cut-outs are provided in order to make it possible to obtain more or less heavy make-up and greater or lesser lengthening and curving of the eyelashes.

The prior art, for example FR-A-2715038, discloses mascara brushes having any shape, a concave notch having been cut out in the brushes over their entire length. Since the bristles of the concave notch are short, they are only slightly wiped off on exit from the reservoir containing the mascara; such brushes give very heavy make-up.

Brushes having the shape of a portion of a torus are also known, these brushes being obtained by twisting the core of a cylindrical brush in an arc of a circle. Such brushes have a convex face, a concave face and two substantially plane faces. Such brushes are not very easy to handle. For example, if the user rotates the stem of such a brush about its axis between her fingers, for example in order to apply a product to the eyelashes, she must continually correct the distance between the brush and the eyelashes. Moreover, it was found that such a brush loaded the eyelashes, but without smoothing them sufficiently. Brushes obtained by twisting the core of a cylindroconical brush in an arc of a circle have the same disadvantages.

SUMMARY OF THE INVENTION

Although these conventional brushes give substantially satisfactory results, it is desirable to have brushes making it possible for the brush to take a good hold of the eyelashes in order to ensure effective smoothing of the product, and good separation of each eyelash while loading the eyelashes with product in order to obtain a sophisticated make-up. It is thus an object of the invention to provide a brush which is simple and economical to use in practice.

It is a further object of the invention to provide a brush for applying a cosmetic product which, when used to apply mascara to the eyelashes, makes it possible to obtain make-up which is sophisticated and of high quality, that is to say heavy, but with the eyelashes appreciably lengthened and well-separated, the brush, moreover, being very easy to handle.

According to a first aspect of the invention, the brush comprises a straight stem defining a main axis, a flexible core comprising two ends, the core being integral with this stem by means of its first end, and bristles implanted radially in this core, the ends of the bristles defining the surface of the brush, this surface comprising a first face. The intersection of any plane passing through the main axis, called the meridian plane, with the surface of the brush defines two curves, called peak lines, having a certain curvature. The peak lines are concave and the first face is substantially straight and parallel to the main axis.

By concave peak lines it is meant that their concavity faces the outside of the brush. The curvature of a peak line is the reciprocal: 1/r of its radius of curvature r.

At each point of the core, the intersection of the surface of the brush with any plane perpendicular to the core defines a cross-section of the brush. Preferably, the core is central in relation to each cross-section of the brush.

The faces are longitudinal portions of the surface of the brush. Preferably, the surface of the brush comprises at least one second face, called a face of maximum curvature. The curvature of the peak lines passes through a maximum in the region of this second face. More preferably, the curvature of the peak lines passes through a single maximum. Preferably, the surface of the brush comprises a single straight face. Preferably, the curvature of the peak lines increases continuously from the straight face to the face of maximum curvature. Preferably, the face of maximum curvature and the straight face are diametrically opposite one another with respect to the core. Preferably, the bristles of the same cross-section are all of the same length.

According to a second aspect of the invention, in a method for the manufacture of a brush according to the invention, a starting brush comprises a straight stem defining a main axis and a flexible core comprising a first and a second end, the first end being integral with this stem, the core being straight and in alignment with the stem, bristles being implanted radially in this core, the ends of the bristles defining the surface of the starting brush, the surface being of overall concave shape, such as, for example, a brush having the shape of a diabolo or of a peanut, the intersection of any meridian plane passing through the main axis, with the surface of the starting brush defining two concave meridian lines having a specific curvature. A first step involves imparting a twist to the core in a meridian plane, the twist being a curvature substantially equal to the curvature of one of the two meridian lines of this plane and being in the opposite direction to the curvature of this meridian line.

At each point of the core, the intersection of the surface of the starting brush with any plane perpendicular to the core defines a cross-section of the starting brush. Preferably, the starting brush is selected in such a way that the core is central in each cross-section of the starting brush.

The surface of the starting brush is thus modified such that one meridian line is converted into a substantially straight peak line, and the curvature of the second meridian line belonging to the same meridian plane is increased substantially. The core remains central in each cross-section of the brush, but these cross-sections are no longer parallel.

Preferably, in a second step, a twist is imparted to that end of the core which is integral with the stem, in order to align the second end of the core with the main axis. The brush according to the invention may thus be used with a mascara reservoir equipped with a wiper of conventional design.

Preferably, one of the meridian planes of the surface of the starting brush is a plane of symmetry of the starting brush. If appropriate, the starting brush has a plane of symmetry perpendicular to the axis of the core. Even more preferably, the surface of this starting brush is a surface of revolution. Advantageously, each cross-section of the starting brush is convex.

This brush is perfectly suitable for making up the eyelashes, and therefore another aspect of the invention provides a make-up device comprising a mascara reservoir and a member for the application of mascara, this application member being a brush according to the invention.

The brush according to the invention has a continuous evolute profile which is plano-concave in relation to its main axis. When the brush executes a revolution about its main axis, for example when the user rotates the stem of the brush between her fingers, it evolves from a substantially plane face which surrounds the straight peak line parallel to the main axis, towards a concave face of increasing radius of curvature, to reach maximum curvature, and then decreasing to return to a plane face.

The substantially plane profile is preferably located diametrically opposite the concavity of the brush with respect to the core. Since each cross-section is perpendicular to the core at any point along the core, the bristles of the brush have a density lower than the rest of the brush along this plane profile. Moreover, these bristles diverge. Preferably, the face diametrically opposite the straight face with respect to the core is that having the greatest curvature. This face thus has a much higher bristle density and these bristles converge.

When the user uses this brush in order to apply a make-up product to the eyelashes, she extracts the brush from the product reservoir, and in doing so passes the brush through a wiper. If the bristles in the same cross-section are all of the same length, they are all wiped. However, the face comprising a substantially plane profile is wiped to a lesser extent because the bristles diverge and are not very dense. By contrast, the face having the greatest curvature is wiped to hardly any extent, since the distribution of the bristles is very dense. The user places the brush against the eyelashes and rotates it between her fingers: the brush smooths, curves and separates the eyelashes by means of its plane profile, then loads the eyelash with product by means of the rest of its surface. The make-up obtained is heavy, lengthened and curved.

Furthermore, the bristles of a brush according to the invention may be of any type: they may be bristles of different lengths, of different diameters or different cross-sections and of different materials, bristles with tapered ends, fork-shaped ends or ends in the form of a pinhead or bristles which have undergone any kind of treatment known in the art.

There may also be provision for the brush according to the first aspect of the invention to comprise an alternation of rows of short bristles and of long bristles, the long bristles alone being taken into account for defining the surface of the brush. This makes it possible to increase the loading of the eyelid with product.

The helical winding of the two branches of the metal wire forming the core may be provided so as to have a right-hand pitch as is conventionally provided in the manufacture of make-up brushes, or a left-hand pitch as taught by FR-A-27011098. To manufacture a brush with a left-hand pitch, the branches of the core are twisted by rotating them to the left in order to form turns which rotate clockwise around the core, starting from the stem and advancing towards the end of the brush. The brush with a left-hand pitch is preferred for the production of brushes according to the invention. This gives the bristle turns an orientation which makes it possible to separate the eyelashes more effectively during make-up.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
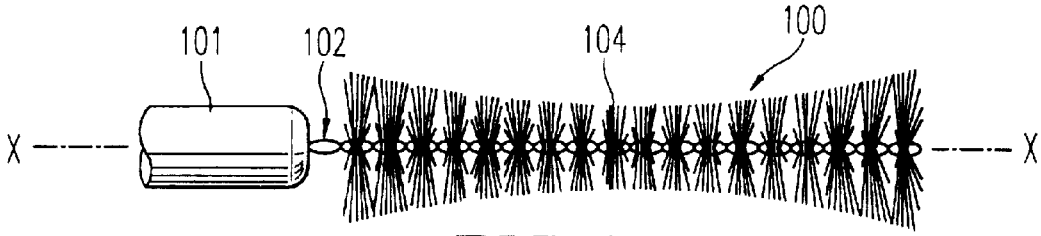
FIGS. 1A and 1B are perspective views of a brush capable of being used for manufacturing a brush according to the invention.
Figure 1B:
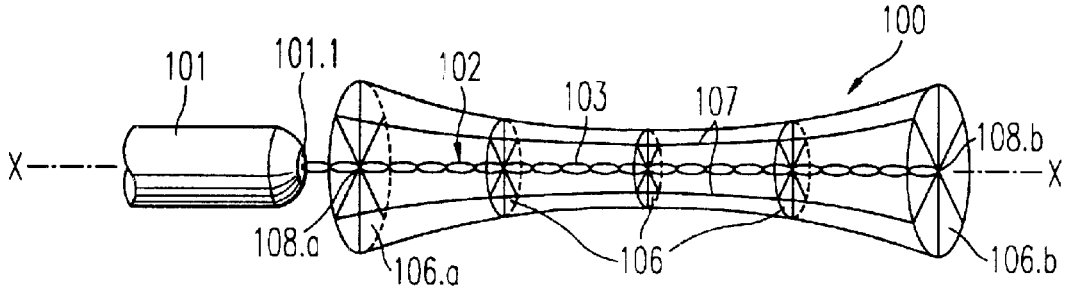

The brush 100 illustrated in FIGS. 1A and 1B comprises a straight stem 101 defining a main axis X—X. Fastened by force fitting to the end 101.1 of this stem 101 is an elongate core 102 (which has been illustrated in these Figures, although it is inside the brush) formed by the helical winding of two branches of a metal wire 103 which has been bent in the form of a U before the branches are twisted. The axis of the core 102 coincides with the main axis X—X. Bristles 104 are implanted radially between the branches of the wire 103. When the branches of the wire 103 are twisted, the bristles are gripped and held between the helical turns of the core 102. The ends of the bristles 104 define the surface of the brush 105: this is a surface of revolution which has the shape of a diabolo and the ends of which consist of two cross-sections, namely the disk 106.a having the center 108.a and the disk 106.b having the center 108.b. Each cross-section 106 of the brush 100 has the shape of a disk, all the cross-sections 106 being parallel to one another. The intersection of the surface 105 with any meridian plane of the brush defines meridian lines 107 which are all identical and which have the same radius of curvature r.

Figure 2A:
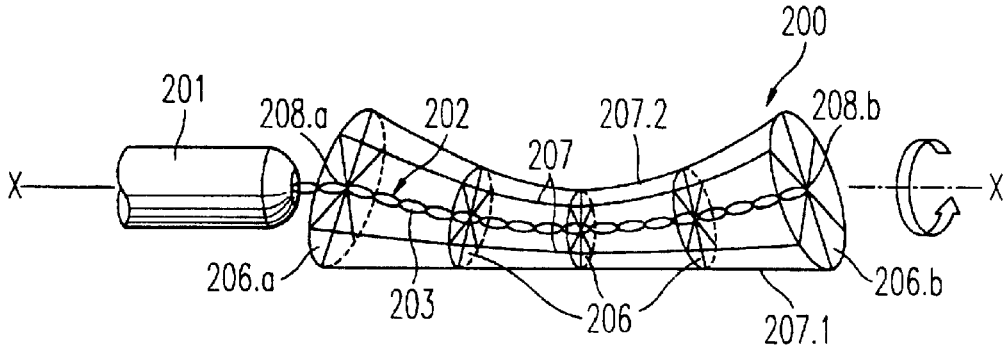
FIGS. 2A and 2B are perspective views of a brush according to the invention made from the brush illustrated in FIG. 1.
Figure 2B:
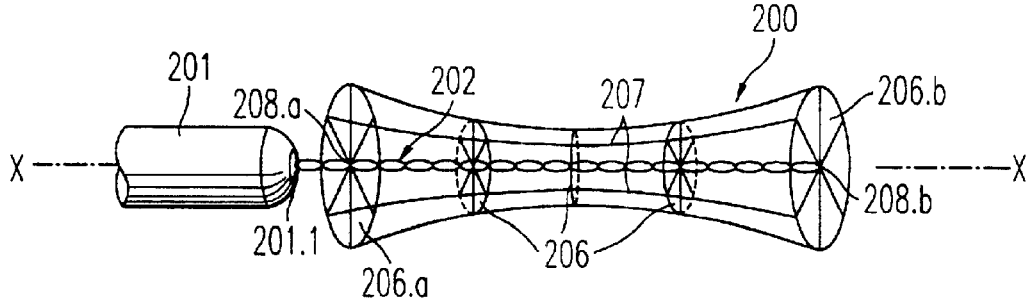

A first twist is imparted to the core 102 in a meridian plane, between the cross-sections 106.a and 106.b, by means of a suitable tool, for example by pressing the core longitudinally around a metal cylinder having a radius of curvature r, in such a way that the core takes the form of one of the meridian lines 107. Then a second twist is imparted thereto in the same plane, between the end 101.1 of the stem and the center 108.a of the end cross-section of the brush, so as to also align the center 108.b of the other end of the brush with the main axis X—X. As a result, the brush 200 illustrated in FIGS. 2A and 2B is obtained. In these figures, the reference numbers assigned to elements similar to those of FIGS. 1A and 1B are those of FIGS. 1A and 1B, increased by 100.

The brush of FIGS. 2A and 2B differs from that of FIGS. 1A and 1B in that the core 202 is curved with a radius of curvature substantially equal to r. However, its ends 208.a and 208.b are aligned with the main axis X—X. The intersection of the surface 205 of the brush with the planes passing through the main axis X—X defines peak lines 207. FIG. 2B is obtained from FIG. 2A by a quarter-turn rotation about the main axis X—X. It can be seen in FIG. 2A that the cross-sections 206 converge, while the cross-sections 106 of the brush of FIG. 1 are parallel.

The brush of FIG. 2A has two faces: a first straight face 207.1 substantially parallel to the main axis X—X and a second curved face 207.2, the faces being diametrically opposite one another with respect to the core 202. The passage from one peak line to another is continuous, with a continuous variation in the curvature from the maximum curvature of 207.2 to a substantially straight peak line such as 207.1.

Figure 3:
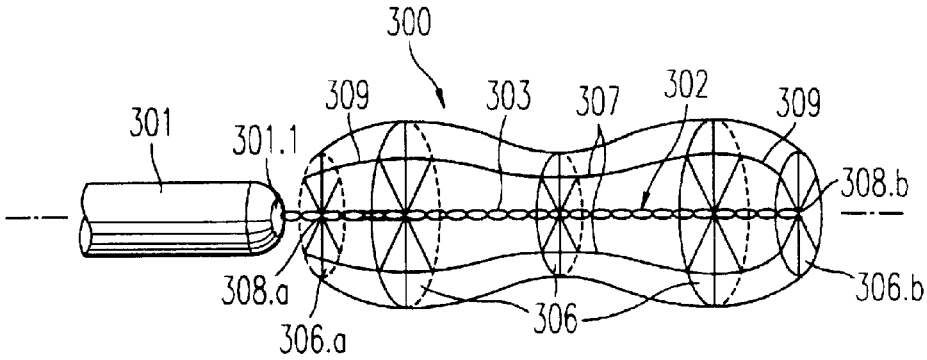
FIG. 3 is a perspective view of a brush capable of being used for manufacturing a brush according to the invention.

In FIG. 3, the reference numbers assigned to elements similar to those of FIGS. 1A and 1B are those of FIGS. 1A and 1B, increased by 200. The brush illustrated in FIG. 3 differs from that of FIG. 1 in its surface 305 which has the shape of a peanut. Each of the cross-sections 306 of the brush has the shape of a disk. The meridian lines 307 have a variable concave main curvature; moreover their ends 309 have a slightly convex shape.

A first twist is imparted to the core 302 in the plane of a meridian line 307.1 between the cross-sections 306.a and 306.b by means of a suitable tool, for example by pressing the core longitudinally around a metal cylinder having a radius of curvature r' in such a way that the said core assumes the same curvature r' as this meridian line 307.1, the twist being executed in the opposite direction to this meridian line. Then a second twist is imparted in the same plane between the end 301.1 of the stem and the center 308.a of the end cross-section of the brush, so as to align the center 308.b of the other end of the brush with the main axis X—X in the same way as the first end 308.a. As the result of the operations described above, the brush 400 illustrated in FIGS. 4A and 4B is obtained. In these figures, the reference numbers assigned to elements similar to those of FIG. 3 are those of FIG. 3, increased by 100.

Figure 4A:
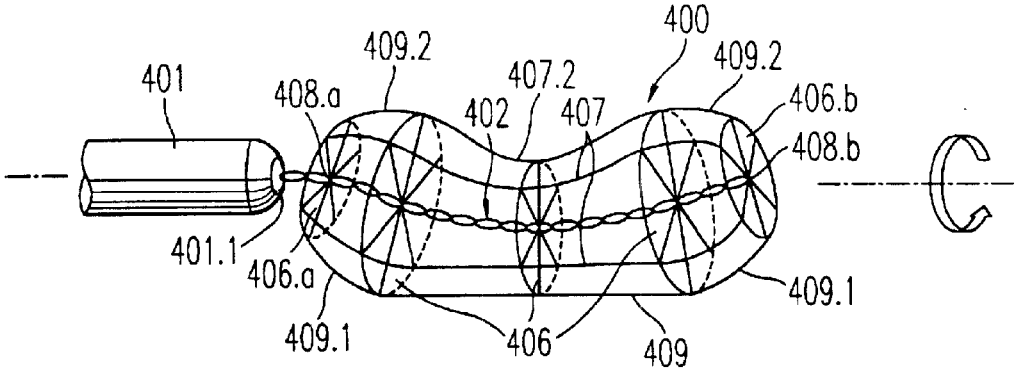
FIGS. 4A and 4B are perspective views of a brush according to the invention made from the brush illustrated in FIG. 3.
Figure 4B:
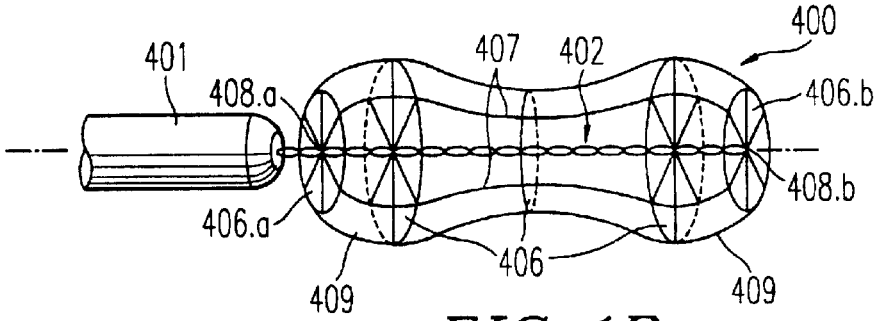

The brush of FIGS. 4A and 4B differs from that of FIG. 2 in that the ends of the surface 405, around the straight sections 406.a and 406.b, are rounded. The core 402 is curved, its curvature r' is substantially equal to that of one of the meridian lines 307.1 of the starting brush of FIG. 3. The intersection of the surface 405 of the brush with the planes passing through the main axis X—X defines peak lines. FIG. 4B is obtained from FIG. 4A by a quarter-turn rotation about the main axis X—X. It can be seen in FIG. 4A that the cross-sections 406, which are circular, converge, while the cross-sections 306 of the brush of FIG. 3 are parallel. The brush of FIG. 4A has two faces: a straight face 407.1, substantially parallel to the main axis X—X and inflected at its ends 409.1 towards the core 402, and a curved face 407.2 which is concave and has an inflection of the curve towards the core 402 at its ends 409.2. The two faces are diametrically opposite one another with respect to the core 402. The passage from one peak line to another is continuous, with a continuous variation in the main curvature about the main axis X—X.

Figure 5:
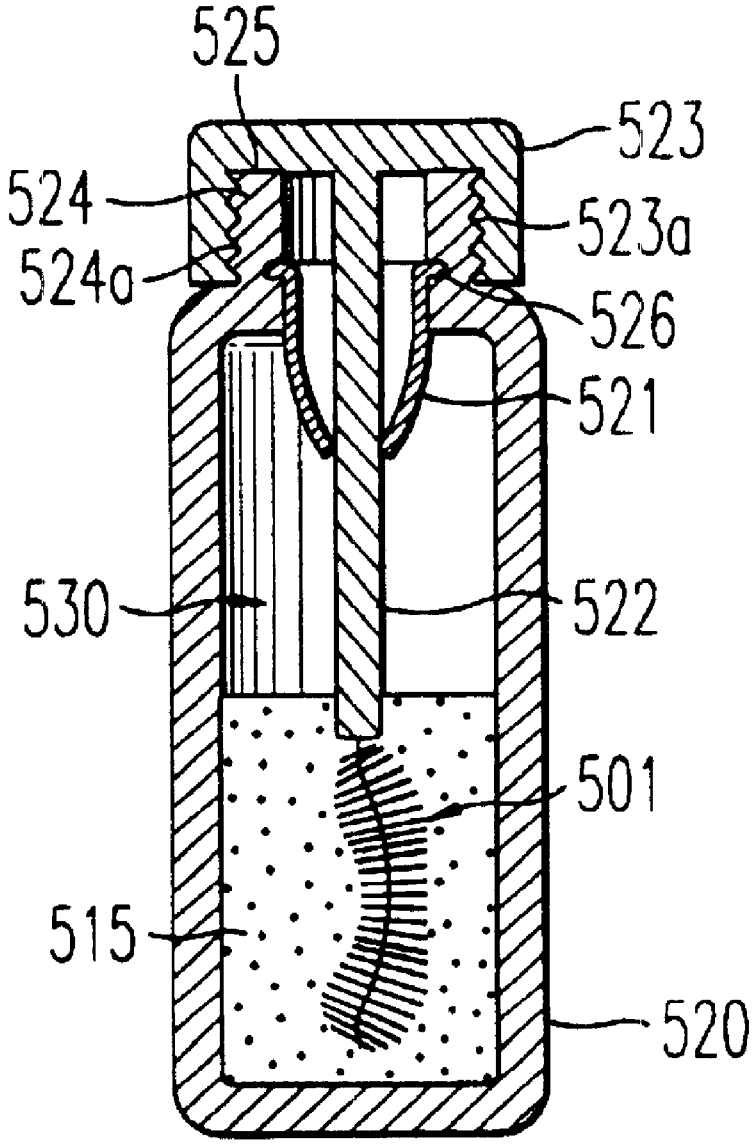
FIG. 5 is a sectional view of an eye make-up device.

The eye make-up device illustrated in FIG. 5 comprises a cylindrical reservoir 520 which has a threaded neck 524 surmounted by a seal 525 and which is filled with mascara 515. The reservoir 520 has a wiper 521 in its neck, the wiper being held in position in the neck by means a bead 526 which cooperates with the shoulder separating the neck from the actual reservoir 520. The conventional wiper 521 is formed of a flexible and elastic material. An applicator intended for cooperating with the reservoir 520 consists of a grasping means 523 which supports an application member 530, the latter comprising a stem 522 and an applicator part 501 which are identical to those illustrated in FIGS. 2A and 2B. The grasping means 523 is in the form of a top and has a thread 523a cooperating with the thread 524a of the neck of the reservoir. The reservoir 520 is closed off sealingly by screwing the grasping means 523 on to the reservoir neck 524.

When the application member 530 is extracted from the reservoir, the applicator part 501 loaded with mascara passes through the wiper 521. The wiper wipes the bristles of the faces of high curvature to a much greater extent than the bristles of the plane faces. When applied to the eyelash, the brush smooths, curves and separates the eyelash by means of its plane profile, then it loads the eyelash with product by means of the rest of its surface.

In comparison with the substantially concave brushes known from the prior art, and in comparison with brushes of varied curvatures, such as curved cylindrical brushes (portions of a torus), known from the prior art, the brush according to the invention affords the advantage of combing the eyelash effectively, thus resulting in a better spreading of the product and a more pronounced lengthening and curving effect.

Obviously, numerous modifications and variations of the present invention are possible in light of the above teachings. It is therefore to be understood that the invention may be practiced otherwise than as specifically described herein.

What is claimed is:

1. A brush comprising:

a straight stem defining a main axis;

a flexible curved core comprising a first *end* and a second end, the first end being integral with said stem; and bristles implanted radially in said core, the ends of the bristles defining the surface of the brush, the surface having a first [face] *portion* which is substantially straight and parallel to the main axis, wherein [an intersection of] any meridian plane [which passes through] *including* the main axis *and not said first portion, intersects* with the surface of the brush [defines] *to define* two [convex] *concave* peak lines having a specific curvature.

2. The brush according to claim 1, wherein the intersection of the surface of the brush with a plane perpendicular to the core at each point of the core defines a cross-section, wherein the core is central in relation to each said cross-section.

3. The brush according to claim 1, wherein said surface has a second [face] *portion* of maximum curvature, wherein the curvature of the peak lines passes through a maximum in the region of the second [face] *portion*.

4. The brush according to claim 3, wherein the curvature of the peak lines increases continuously from the [straight face] *first portion* to the [face of maximum curvature] *second portion*.

5. The brush according to claim 1, wherein the surface of the brush has a single *substantially* straight [face] *portion*.

6. The brush according to claim 1, wherein the curvature of the peak lines passes through a single maximum.

7. The brush according to claim 3, wherein the [face of maximum curvature] *second portion* and the [straight face] *first portion* are diametrically opposite one another with respect to the core.

8. The brush according to claim 2, wherein the bristles of each cross-section are all of the same length.

9. The brush according to claim 1, wherein the ends of the core are aligned with the main axis.

10. The brush according to claim 1, wherein the core is formed of two helically wound branches of a metal wire bent in the form of a U.

11. The brush according to claim 10, wherein the helical winding of the two branches of the metal wire forming the core has a left-hand pitch.

12. The brush according to claim 1 including an alternation of rows of short bristles and long bristles, only the long bristles being taken into account for defining the surface of the brush.

13. A method for the manufacture of a brush, comprising [the steps of]:

[forming] *providing* a starting brush having a straight stem defining a main axis, a flexible [curved] core comprising a first *end* and a second end, the first end being integral with said stem, and bristles implanted radially in said core, the ends of the bristles defining the surface of the brush, [the surface having a first face which is substantially straight and parallel to the main axis,] wherein [an intersection of] any meridian plane [which passes through] *including* the main axis*, intersects* with the surface of the brush [defines] *to define* two [convex] *concave* peak lines having a specific curvature; and

[imparting a twist to] *bending* the core in a [said] *first* meridian plane[, said twist being] *including the main axis so that* a curvature *of the core is* substantially equal to the curvature of one of the two [meridian] *concave peak* lines [of the] *defined by said first meridian* plane [and]*, the curvature of said core* being in the opposite direction to the curvature of the [one meridian] *other concave peak* line *defined by said first meridian plane*.

14. The method according to claim 13, wherein the intersection of the surface of the starting brush with a plane perpendicular to the core, at each point of the core, defines a cross-section of the starting brush, wherein the core is central in relation to each cross-section.

15. The method according to claim 13 [including a step of imparting a twist to]*, further comprising bending* the end of the core [which is] integral with the stem so as to align the second end of the core with the main axis.

16. The method according to claim 13, wherein the surface of the starting brush has a meridian plane of symmetry.

17. The method according to claim 13, wherein the surface of the starting brush is a surface of revolution.

18. The method according to claim 13, wherein the starting brush has a plane of symmetry perpendicular to the axis of the core.

19. The method according to claim 13, wherein each cross-section of the starting brush is convex.

20. The method according to claim 13, wherein each cross-section of the starting brush is in the shape of a disk.

21. The method according to claim 13, wherein *the surface of* the starting brush is in the shape of a diabolo.

22. The method according to claim [12] *13*, wherein the surface of the starting brush is in the shape of *a* peanut.

23. A make-up device comprising:

a mascara reservoir; and a member for the application of mascara, the application member comprising *a* brush having a straight stem defining a main axis, a flexible curved core comprising a first *end* and a second end, the first end being integral with said stem, and bristles implanted radially in said core, the ends of the bristles defining the surface of the brush, the surface having a first [face which is] *portion* substantially straight and parallel to the main axis, wherein [an intersection of] any meridian plane [which passes through] *including* the main axis *and not said first portion, intersects* with the surface of the brush [defines] *to define* two [convex] *concave* peak lines having a specific curvature.

*24. A brush comprising:*

*a core including first and second ends; and*

*bristles extending radially from said core and being located between a first point along said core and a second point along said core, said bristles having ends defining a surface of said brush, said core being curved between said first and second points;*

*wherein an intersection of said surface and a first plane including said core defines a first line segment and a second line segment, said first line segment being substantially straight, and said second line segment being curved.*

*25. The brush according to claim 24, further comprising a stem on one of said first and second ends of said core.*

*26. The brush according to claim 25, wherein said stem defines an axis of said brush, and wherein said first line segment is substantially parallel to said axis.*

*27. The brush according to claim 25, wherein said stem is on said first end of said core and said second point is located at said second end of said core.*

*28. The brush according to claim 24, wherein a straight line passing through said first and second points defines an axis of said brush, and wherein said first line segment is substantially parallel to said axis.*

*29. The brush according to claim 24, wherein curvature of said second line segment is concave.*

*30. The brush according to claim 24, wherein said core is flexible.*

*31. The brush according to claim 24, wherein an intersection of said surface of said brush and a cross-sectional plane defines a cross-section of said brush, said cross-sectional plane including an intersection point along said core and being perpendicular to a line tangent to the core at said intersection point, and wherein bristles defining said surface at said intersection with said cross-sectional plane are of the same length.*

*32. The brush according to claim 24, wherein an intersection of said surface of said brush and a cross-sectional plane defines a cross-section of said brush, said cross-sectional plane including an intersection point along said core and being perpendicular to a line tangent to the core at said intersection point, and wherein said core is located in a central portion of said cross-section.*

*33. The brush according to claim 24, wherein said core is formed of two helically wound branches of a metal wire.*

*34. The brush according to claim 33, wherein said helical winding of said branches has a left-hand pitch.*

*35. The brush according to claim 24, wherein said bristles include short bristles and long bristles, and wherein said surface is defined by the long bristles.*

*36. A brush comprising:*

*a core including first and second ends; and*

*bristles extending radially from said core and being located between a first point along said core and a second point along said core, said bristles having ends defining a surface of said brush;*

*wherein an intersection of said surface and a first plane including said core defines a first line segment and a second line segment, said first line segment being substantially straight, and said second line segment having concave curvature, and*

*wherein an intersection of said surface and a second plane passing through said core and being perpendicular to said first plane defines third and fourth line segments, said third line segment being curved.*

*37. The brush according to claim 36, wherein the curvature of said third line segment is concave.*

*38. The brush according to claim 36, wherein said fourth line segment is curved.*

*39. The brush according to claim 38, wherein the curvature of said third and fourth line segments is concave.*

*40. The brush according to claim 36, further comprising a stem on one of said first and second ends of said core.*

*41. The brush according to claim 40, wherein said stem defines an axis of said brush, and wherein said first line segment is substantially parallel to said axis.*

*42. The brush according to claim 40, wherein said stem is on said first end of said core and said second point is located at said second end of said core.*

*43. The brush according to claim 36, wherein a straight line passing through said first and second points defines an axis of said brush, and wherein said first line segment is substantially parallel to said axis.*

*44. The brush according to claim 43, wherein said second plane includes said axis.*

*45. The brush according to claim 36, wherein said core is curved.*

*46. The brush according to claim 45, wherein said core is flexible.*

*47. The brush according to claim 36, wherein an intersection of said surface of said brush and a cross-sectional plane defines a cross-section of said brush, said cross-sectional plane including an intersection point along said core and being perpendicular to a line tangent to the core at said intersection point, and wherein said core is located in a central portion of said cross-section.*

*48. The brush according to claim 36, wherein an intersection of said surface of said brush and a cross-sectional plane defines a cross-section of said brush, said cross-sectional plane including an intersection point along said core and being perpendicular to a line tangent to said core at said intersection point, and wherein bristles defining said surface at said intersection with said cross-sectional plane are of the same length.*

*49. The brush according to claim 36, wherein said core is formed of two helically wound branches of a metal wire.*

*50. The brush according to claim 49, wherein said helical winding of said branches has a left-hand pitch.*

*51. The brush according to claim 36, wherein said bristles include short bristles and long bristles, and wherein said surface of said brush is defined by the long bristles.*

*52. A device comprising:*

*the brush according to claim 24; and*

*a reservoir for containing a product to be applied by the brush.*

*53. The device according to claim 52, further comprising a wiper configured to wipe product from the bristles.*

*54. The device according to claim 52, wherein the reservoir contains mascara.*

*55. A device comprising:*

*the brush according to claim 36; and*

*a reservoir for containing a product to be applied by the brush.*

*56. The device according to claim 55, further comprising a wiper configured to wipe product from the bristles.*

*57. The device according to claim 55, wherein the reservoir contains mascara.*

*58. A method of manufacturing a brush, comprising:*

*providing a starting brush including*

*a core including first and second ends, and being substantially straight, and*

*bristles extending radially from said core and being located between a first point along said core and a second point along said core, said bristles having ends defining a surface of said starting brush,*

*wherein an intersection of said surface and a first plane including said core defines a first line segment and a second line segment, said first line segment being curved; and*

*bending said core of said brush so that at least a portion of said first line segment becomes substantially straight.*

*59. The method according to claim 58, wherein said second line segment is curved.*

*60. The method according to claim 58, wherein said starting brush further comprises a stem on one of said first and second ends of said core.*

*61. The method according to claim 60, wherein said stem defines an axis of said brush, and wherein said bending includes bending said core of said brush so that at least a portion of said first line segment becomes substantially parallel to said axis.*

*62. The method according to claim 61, wherein said stem is on said first end of said core, and wherein the method further comprises bending said first end of said core so that said second end of said core becomes aligned with said axis.*

*63. The method according to claim 58, wherein a straight line passing through said first and second points defines an axis of said brush, and wherein said bending includes bending said core of said brush so that at least a portion of said first line segment becomes substantially parallel to said axis.*

*64. The method according to claim 60, wherein a straight line passing through said first and second points defines an axis of said brush, wherein said stem is on said first end of said core, and wherein the method further comprises bending said first end of said core so that said stem becomes aligned with said axis.*

*65. The method according to claim 59, wherein curvature of said first and second curved line segments before said bending is concave.*

*66. The method according to claim 58, wherein an intersection of said surface of said starting brush and a cross-sectional plane defines a cross-section of said starting brush, said cross-sectional plane including an intersection point along said core and being perpendicular to a line tangent to said core at said intersection point, and wherein said core is located in a central portion of said cross-section.*

*67. The method according to claim 61, wherein said surface of said starting brush is symmetrical about a plane including said axis.*

*68. The method according to claim 63, wherein said surface of said starting brush is symmetrical about a plane including said axis.*

*69. The method according to claim 58, wherein said surface of said starting brush is symmetrical about a cross-sectional plane including an intersection point along said core, the cross-sectional plane being perpendicular to a line tangent to the core at said intersection point.*

*70. The method according to claim 58, wherein an intersection of said surface of said starting brush and a cross-sectional plane defines a cross-section of said starting brush, said cross-sectional plane including an intersection point along said core and being perpendicular to a line tangent to the core at said intersection point, and wherein said cross-section of said starting brush is disk-shaped.*

*71. The method according to claim 59, wherein curvature of said core after said bending is substantially the same as curvature of said second line segment before said bending.*

*72. The method according to claim 58, wherein said surface of said starting brush is diabolo-shaped.*

*73. The method according to claim 58, wherein said surface of said starting brush is peanut-shaped.*

*74. A brush manufactured according to the method of claim 58.*

*75. A brush manufactured according to the method of claim 65.*

*76. A brush manufactured according to the method of claim 70.*

*77. A brush manufactured according to the method of claim 72.*

*78. A brush manufactured according to the method of claim 73.*

*79. A brush comprising:*

*a core including first and second ends; and*

*bristles extending radially from said core and being located between a first point along said core and a second point along said core, said bristles having ends defining a surface of said brush, said core being curved between said first and second points;*

*wherein a straight line passing through said first and second points defines an axis of said brush, and*

*wherein an intersection of said surface and a first plane including said axis defines a first line segment and a second line segment, said first line segment being substantially straight, and said second line segment being curved.*

*80. The brush according to claim 79, further comprising a stem on one of said first and second ends of said core.*

*81. The brush according to claim 80, wherein said stem is aligned with said axis.*

*82. The brush according to claim 80, wherein said stem is on said first end of said core and said second point is located at said second end of said core.*

*83. The brush according to claim 79, wherein said first line segment is substantially parallel to said axis.*

*84. The brush according to claim 79, wherein curvature of said second line segment is concave.*

*85. The brush according to claim 79, wherein said core is flexible.*

*86. The brush according to claim 79, wherein an intersection of said surface of said brush and a cross-sectional plane defines a cross-section of said brush, said cross-sectional plane including an intersection point along said core and being perpendicular to a line tangent to the core at said intersection point, and wherein bristles defining said surface at said intersection with said cross-sectional plane are of the same length.*

*87. The brush according to claim 79, wherein an intersection of said surface of said brush and a cross-sectional plane defines a cross-section of said brush, said cross-sectional plane including an intersection point along said core and being perpendicular to a line tangent to the core at said intersection point, and wherein said core is located in a central portion of said cross-section.*

*88. The brush according to claim 79, wherein said core is formed of two helically wound branches of a metal wire.*

*89. The brush according to claim 88, wherein said helical winding of said branches has a left-hand pitch.*

*90. The brush according to claim 79, wherein said bristles include short bristles and long bristles, and wherein said surface of said brush is defined by the long bristles.*

*91. A brush comprising:*

*a core including first and second ends; and*

*bristles extending radially from said core and being located between a first point along said core and a second point along said core, said bristles having ends defining a surface of said brush;*

*wherein a straight line passing through said first and second points defines an axis of said brush,*

*wherein an intersection of said surface and a first plane including said axis defines a first line segment and a second line segment, said first line segment being substantially straight, and said second line segment having concave curvature, and*

*wherein an intersection of said surface and a second plane including said axis and being perpendicular to said first plane defines third and fourth line segments, said third line segment being curved.*

*92. The brush according to claim 91, wherein the curvature of said third line segment is concave.*

*93. The brush according to claim 91, wherein said fourth line segment is curved.*

*94. The brush according to claim 93, wherein the curvature of said third and fourth line segments is concave.*

*95. The brush according to claim 91, further comprising a stem on one of said first and second ends of said core.*

*96. The brush according to claim 95, wherein said stem is aligned with said axis.*

*97. The brush according to claim 95, wherein said stem is on said first end of said core and said second point is located at said second end of said core.*

*98. The brush according to claim 91, wherein said first line segment is substantially parallel to said axis.*

*99. The brush according to claim 91, wherein said core is curved.*

*100. The brush according to claim 99, wherein said core is flexible.*

*101. The brush according to claim 91, wherein an intersection of said surface of said brush and a cross-sectional plane defines a cross-section of said brush, said cross-sectional plane including an intersection point along said core and being perpendicular to a line tangent to the core at said intersection point, and wherein said core is located in a central portion of said cross-section.*

*102. The brush according to claim 91, wherein an intersection of said surface of said brush and a cross-sectional plane defines a cross-section of said brush, said cross-sectional plane including an intersection point along said core and being perpendicular to a line tangent to the core at said intersection point, and wherein bristles defining said surface at said intersection with said cross-sectional plane are of the same length.*

*103. The brush according to claim 91, wherein said core is formed of two helically wound branches of a metal wire.*

*104. The brush according to claim 103, wherein said helical winding of said branches has a left-hand pitch.*

*105. The brush according to claim 91, wherein said bristles include short bristles and long bristles, and wherein said surface of said brush is defined by the long bristles.*

*106. A device comprising:*

*the brush according to claim 79; and*

*a reservoir for containing a product to be applied by the brush.*

*107. The device according to claim 106, further comprising a wiper configured to wipe product from the bristles.*

*108. The device according to claim 106, wherein the reservoir contains mascara.*

*109. A device comprising:*

*the brush according to claim 91; and*

*a reservoir for containing a product to be applied by the brush.*

*110. The device according to claim 109, further comprising a wiper configured to wipe product from the bristles.*

*111. The device according to claim 109, wherein the reservoir contains mascara.*

*112. A method of manufacturing a brush, comprising:*

*providing a starting brush including*

*a core including first and second ends, and being substantially straight, a line extending between two points on said core defining an axis, and*

*bristles extending radially from said core and being located between a first point along said core and a second point along said core, said bristles having ends defining a surface of said starting brush,*

*wherein an intersection of said surface and a first plane including said axis defines a first line segment and a second line segment, said first line segment being curved; and*

*bending said core of said brush so that at least a portion of said first line segment becomes substantially straight.*

*113. The method according to claim 112, wherein said second line segment is curved.*

*114. The method according to claim 112, wherein said starting brush further comprises a stem on one of said first and second ends of said core.*

*115. The method according to claim 114, wherein said stem is on said first end of said core, and wherein the method further comprises bending said first end so that said stem becomes aligned with said axis.*

*116. The method according to claim 112, wherein said bending includes bending said core of said brush so that at least a portion of said first line segment becomes substantially parallel to said axis.*

*117. The method according to claim 113, wherein curvature of said first and second curved line segments before said bending is concave.*

*118. The method according to claim 112, wherein an intersection of said surface of said starting brush and a cross-sectional plane defines a cross-section of said starting brush, said cross-sectional plane including an intersection point along said core and being perpendicular to a line tangent to the core at said intersection point, and wherein said core is located in a central portion of said cross-section.*

*119. The method according to claim 112, wherein said surface of said starting brush is symmetrical about a plane including said axis.*

*120. The method according to claim 112, wherein said surface of said starting brush is symmetrical about a cross-sectional plane including an intersection point along said core, the cross-sectional plane being perpendicular to a line tangent to the core at said intersection point.*

*121. The method according to claim 112, wherein an intersection of said surface of said starting brush and a cross-sectional plane defines a cross-section of said starting brush, said cross-sectional plane including an intersection point along said core and being perpendicular to a line tangent to the core at said intersection point, and wherein said cross-section of said starting brush is disk-shaped.*

*122. The method according to claim 112, wherein curvature of said core after said bending is substantially the same as curvature of said second line segment before said bending.*

*123. The method according to claim 112, wherein said surface of said starting brush is diabolo-shaped.*

*124. The method according to claim 112, wherein said surface of said starting brush is peanut-shaped.*

*125. A brush manufactured according to the method of claim 112.*

*126. A brush manufactured according to the method of claim 117.*

*127. A brush manufactured according to the method of claim 121.*

*128. A brush manufactured according to the method of claim 123.*

*129. A brush manufactured according to the method of claim 124.*

*130. A brush comprising:*

*a core including first and second ends, said core being curved along a length of said core;*

*a stem defining an axis of the brush, said stem being on one of said first and second ends of said core; and*

*bristles extending radially from said core and being located along said core, said bristles having ends defining a surface of said brush,*

*wherein an intersection of said surface and a first plane including said axis defines a first line segment and a second line segment, said first line segment being substantially straight, and said second line segment being curved.*

*131. The brush according to claim 130, wherein said first line segment is substantially parallel to said axis.*

*132. The brush according to claim 130, wherein curvature of said second line segment is concave.*

*133. The brush according to claim 130, wherein said core is flexible.*

*134. The brush according to claim 130, wherein an intersection of said surface of said brush and a cross-sectional plane defines a cross-section of said brush, said cross-sectional plane including an intersection point along said core and being perpendicular to a line tangent to the core at said intersection point, and wherein bristles defining said surface at said intersection with said cross-sectional plane are of the same length.*

*135. The brush according to claim 130, wherein an intersection of said surface of said brush and a cross-sectional plane defines a cross-section of said brush, said cross-sectional plane including an intersection point along said core and being perpendicular to a line tangent to the core at said intersection point, and wherein said core is located in a central portion of said cross-section.*

*136. The brush according to claim 130, wherein said core is formed of two helically wound branches of a metal wire.*

*137. The brush according to claim 136, wherein said helical winding of said branches has a left-hand pitch.*

*138. The brush according to claim 130, wherein said bristles include short bristles and long bristles, and wherein said surface of said brush is defined by the long bristles.*

*139. The brush according to claim 130, said bristles being located along said curve of said core.*

*140. A brush comprising:*

*a core including first and second ends;*

*a stem defining an axis of the brush, said stem being on one of said first and second ends of said core; and*

*bristles extending radially from said core and being located along said core, said bristles having ends defining a surface of said brush;*

*wherein an intersection of said surface and a first plane including said axis defines a first line segment and a second line segment, said first line segment being substantially straight, and said second line segment having concave curvature, and*

*wherein an intersection of said surface and a second plane including said axis and being perpendicular to said first plane defines third and fourth line segments, said third line segment being curved.*

*141. The brush according to claim 140, wherein the curvature of said third line segment is concave.*

*142. The brush according to claim 140, wherein said fourth line segment is curved.*

*143. The brush according to claim 142, wherein the curvature of said third and fourth line segments is concave.*

*144. The brush according to claim 140, wherein said first line segment is substantially parallel to said axis.*

*145. The brush according to claim 140, wherein said core is curved.*

*146. The brush according to claim 145, wherein said core is flexible.*

*147. The brush according to claim 140, wherein an intersection of said surface of said brush and a cross-sectional plane defines a cross-section of said brush, said cross-sectional plane including an intersection point along said core and being perpendicular to a line tangent to the core at said intersection point, and wherein said core is located in a central portion of said cross-section.*

*148. The brush according to claim 140, wherein an intersection of said surface of said brush and a cross-sectional plane defines a cross-section of said brush, said cross-sectional plane including an intersection point along said core and being perpendicular to a line tangent to the core at said intersection point, and wherein bristles defining said surface at said intersection with said cross-sectional plane are of the same length.*

*149. The brush according to claim 140, wherein said core is formed of two helically wound branches of a metal wire.*

*150. The brush according to claim 149, wherein said helical winding of said branches has a left-hand pitch.*

*151. The brush according to claim 140, wherein said bristles include short bristles and long bristles, and wherein said surface of said brush is defined by the long bristles.*

*152. A device comprising:*

*the brush according to claim 130; and*

*a reservoir for containing a product to be applied by the brush.*

*153. The device according to claim 152, further comprising a wiper configured to wipe product from the bristles.*

*154. The device according to claim 152, wherein the reservoir contains mascara.*

*155. A device comprising:*

*the brush according to claim 140; and*

*a reservoir for containing a product to be applied by the brush.*

*156. The device according to claim 155, further comprising a wiper configured to wipe product from the bristles.*

*157. The device according to claim 155, wherein the reservoir contains mascara.*

*158. A method of manufacturing a brush, comprising:*

*providing a starting brush including*

*a core including first and second ends, and being substantially straight,*

*a stem defining an axis, said stem being on one of said first and second ends of said core, and*

*bristles extending radially from said core and being located along said core, said bristles having ends defining a surface of said starting brush,*

*wherein an intersection of said surface and a first plane including said axis defines a first line segment and a second line segment, said first line segment being curved; and*

*bending said core of said brush so that at least a portion of said first line segment becomes substantially straight.*

*159. The method according to claim 158, wherein said second line segment is curved.*

*160. The method according to claim 158, wherein said stem is on said first end of said core, and wherein the method further comprises bending said first end of said core so that said second end of said core becomes aligned with said axis.*

*161. The method according to claim 158, wherein said bending includes bending said core of said brush so that at least a portion of said first line segment becomes substantially parallel to said axis.*

*162. The method according to claim 159, wherein curvature of said first and second curved line segments before said bending is concave.*

*163. The method according to claim 158, wherein an intersection of said surface of said starting brush and a cross-sectional plane defines a cross-section of said starting brush, said cross-sectional plane including an intersection point along said core and being perpendicular to a line tangent to the core at said intersection point, and wherein said core is located in a central portion of said cross-section.*

*164. The method according to claim 158, wherein said surface of said starting brush is symmetrical about a plane including said axis.*

*165. The method according to claim 158, wherein said surface of said starting brush is symmetrical about a cross-sectional plane including an intersection point along said core, the cross-sectional plane being perpendicular to a line tangent to the core at said intersection point.*

*166. The method according to claim 158, wherein an intersection of said surface of said starting brush and a cross-sectional plane defines a cross-section of said starting brush, said cross-sectional plane including an intersection point along said core and being perpendicular to a line tangent to the core at said intersection point, and wherein said cross-section of said starting brush is disk-shaped.*

*167. The method according to claim 158, wherein curvature of said core after said bending is substantially the same as curvature of said second line segment before said bending.*

*168. The method according to claim 158, wherein said surface of said starting brush is diabolo-shaped.*

*169. The method according to claim 158, wherein said surface of said starting brush is peanut-shaped.*

*170. A brush manufactured according to the method of claim 158.*

*171. A brush manufactured according to the method of claim 162.*

*172. A brush manufactured according to the method of claim 166.*

*173. A brush manufactured according to the method of claim 168.*

*174. A brush manufactured according to the method of claim 169.*

* * * * *